United States Patent [19]

McMurtry et al.

[11] Patent Number: 5,016,199

[45] Date of Patent: * May 14, 1991

[54] CO-ORDINATE MEASURING

[75] Inventors: David R. McMurtry, Wotton-under-Edge; John P. Robertson, Horfield; Alan D. Darlington, Dursley, all of United Kingdom

[73] Assignee: Renishaw plc, Wotton-under-Edge, United Kingdom

[*] Notice: The portion of the term of this patent subsequent to Feb. 13, 2007 has been disclaimed.

[21] Appl. No.: 464,596

[22] Filed: Jan. 12, 1990

Related U.S. Application Data

[63] Continuation of Ser. No. 76,688, Jul. 22, 1987, Pat. No. 4,901,256.

[30] Foreign Application Priority Data

Jul. 25, 1986 [GB] United Kingdom ............... 8618152

[51] Int. Cl.$^5$ .............................................. G01B 21/20
[52] U.S. Cl. ........................................ 364/560; 33/503; 33/504; 364/167.01; 364/474.03; 364/474.37
[58] Field of Search ......................... 33/503, 504; 364/167.01, 474.03, 474.37, 560

[56] References Cited

U.S. PATENT DOCUMENTS

| | | | |
|---|---|---|---|
| 3,749,501 | 7/1973 | Wieg | 33/1 M X |
| 4,153,998 | 5/1979 | McMurtry | 33/174 |
| 4,167,066 | 9/1979 | Cooper et al. | 33/504 |
| 4,168,576 | 9/1979 | McMurtry | 33/503 X |
| 4,281,385 | 7/1981 | Nakaso et al. | 364/474 |
| 4,296,474 | 10/1981 | Hurt | 364/560 |
| 4,382,215 | 5/1983 | Barlow et al. | 318/568 |
| 4,384,332 | 5/1983 | McMurtry | 364/474 |
| 4,490,781 | 12/1984 | Kishi et al. | 364/191 |
| 4,562,392 | 12/1985 | Davis et al. | 364/474 |
| 4,653,011 | 3/1987 | Iwano | 364/560 X |
| 4,663,852 | 5/1987 | Guarini | 33/503 |
| 4,677,755 | 7/1987 | Iwano et al. | 33/504 X |
| 4,679,331 | 7/1987 | Koontz | 33/503 X |
| 4,719,703 | 1/1988 | Ross et al. | 33/503 X |
| 4,782,598 | 11/1988 | Guarini | 33/503 |
| 4,901,256 | 2/1990 | McMurtry et al. | 364/560 |

FOREIGN PATENT DOCUMENTS

| | | |
|---|---|---|
| 0077243 | 4/1983 | European Pat. Off. . |
| 2471629 | 6/1981 | France . |
| 2567641 | 1/1986 | France . |
| 2108715 | 5/1983 | United Kingdom . |

OTHER PUBLICATIONS

Renishaw Users Handbook, Renishaw Electrical Limited, "3 Dimensional Touch Trigger Probes For Measuring Machines", Jul./1979, pp. 1-37.
Renishaw Users Handbook, "MP3 Probe with 360° Optical Transmission System", Nov./1984, pp. 1-37.
Renishaw Users Handbook, "Programs for Probes, Component Inspection and Tool Datuming with Fanuc 6TB Control", Dec./1984, pp. 1-64.
von Christof Bischof, "Die Software, ein wesntlicher Bestandteil der Koordinatenmebtechnik" 1985, pp. 12-15, 17.
Japanese Patent Abstracts, vol. 6 #252 (p-161), (1130), Dec. 10, 1982 Abstract for 57-148209.

Primary Examiner—Parshotam S. Lall
Assistant Examiner—Edward R. Cosimano
Attorney, Agent, or Firm—Spencer & Frank

[57] ABSTRACT

A co-ordinate measuring machine has a probe (62) used to touch points on an article (61) under manual control by a user, e.g. from a joystick (69). A computer (71) determines a vector describing the direction of probe movement prior to touching each point. On the basis of the number of points touched by the user and their respective vectors, the computer makes a decision as to the shape of a feature of the article under inspection, e.g. whether it is a flange, slot, boss, bore, internal sphere, external sphere, cylinder or cone. It can then either calculate a relevant geometrical parameter such as a dimension of the feature, or write a part program for future inspection of the feature on further, nominally identical articles (61). This can be done automatically without the need for the user to tell the computer anything about the shape of the feature concerned.

21 Claims, 13 Drawing Sheets

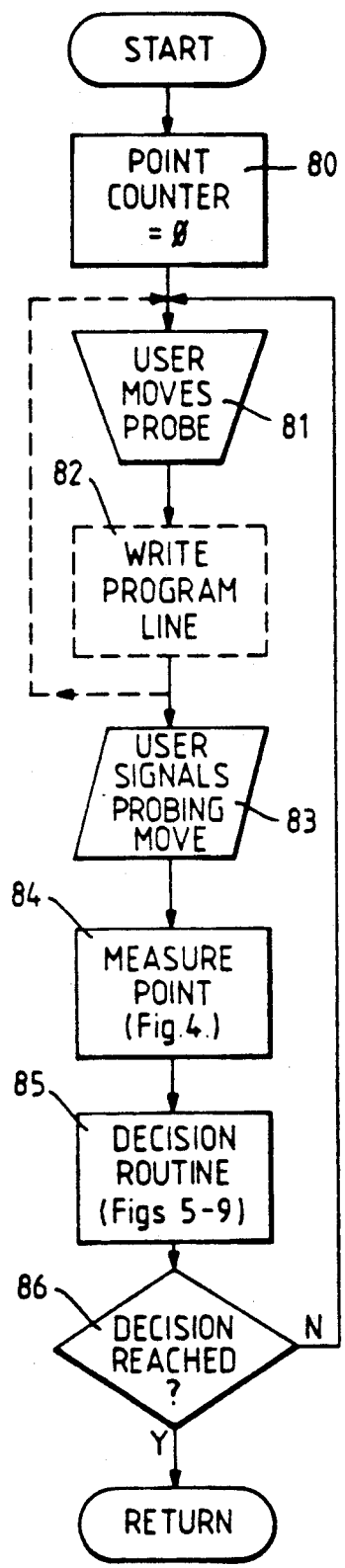
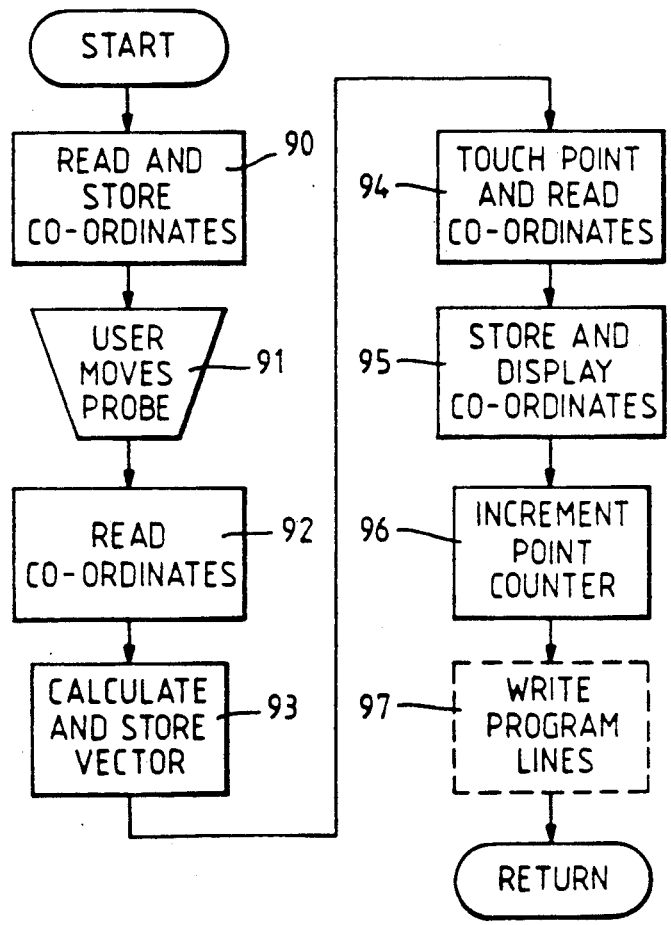

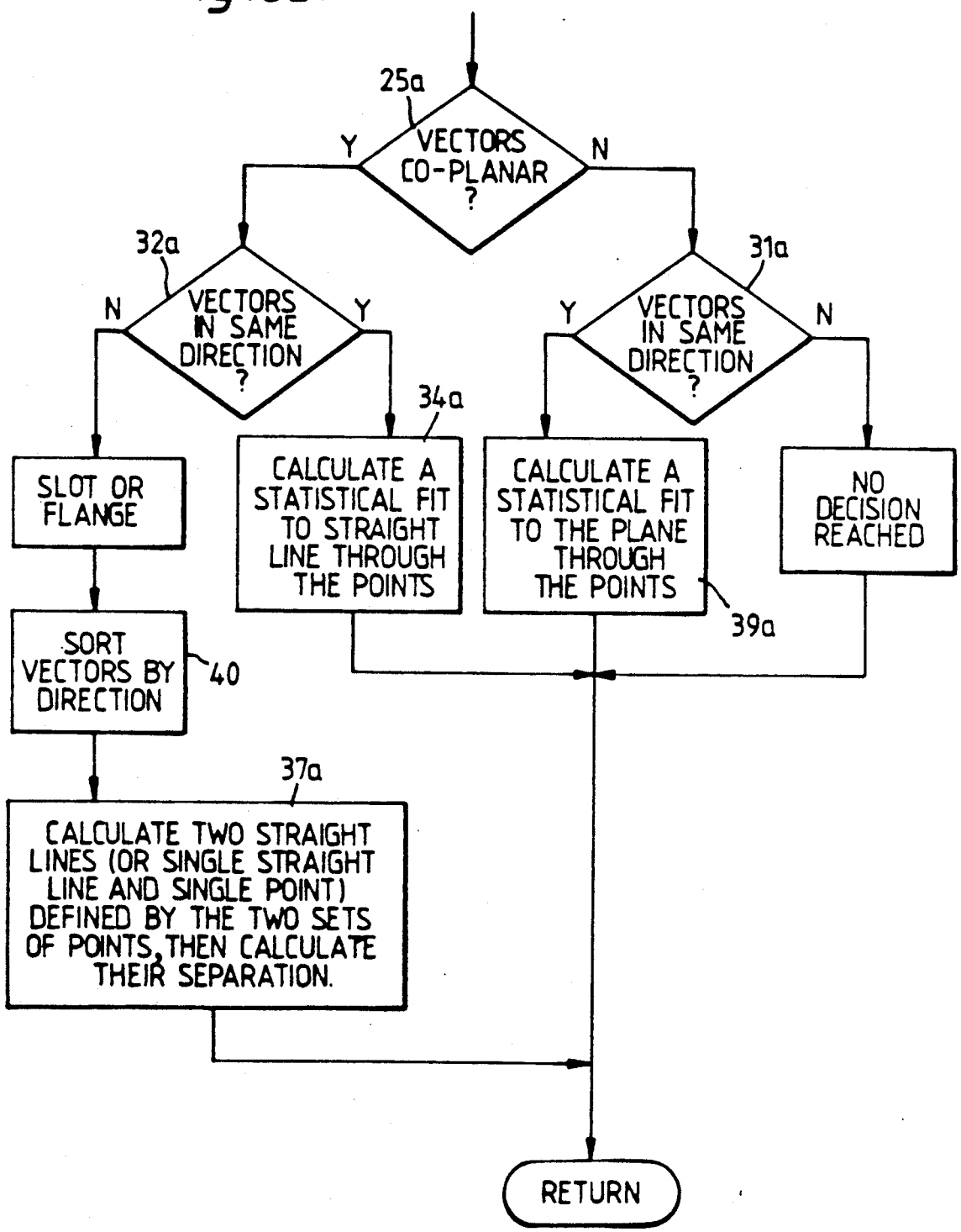

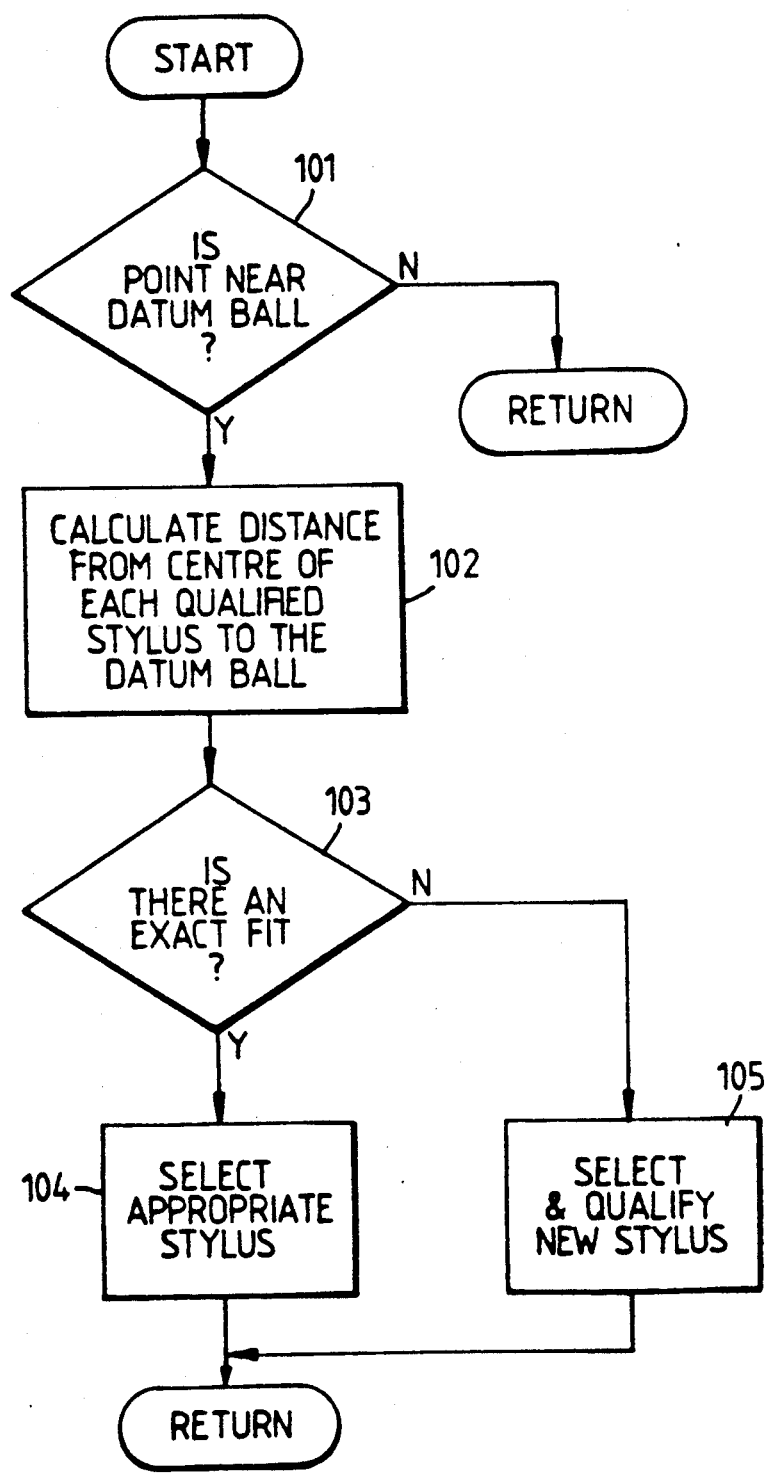

CO-ORDINATE MEASURING

CROSS REFERENCE TO RELATED APPLICATIONS

This application is a Continuation of application Ser. No. 07/076,688, filed Jul. 22nd, 1987, which issued as U.S. Pat. No. 4,901,256 on Feb. 13th, 1990.

FIELD OF THE INVENTION

The present invention relates to co-ordinate measuring.

DESCRIPTION OF PRIOR ART

It is well known to mount a probe for movement on a co-ordinate positioning apparatus such as a machine tool or co-ordinate measuring machine (CMM). Such apparatus has associated co-ordinate measuring units such as scales or resolvers, which produce a co-ordinate dependent output for each axis of movement. The probe may, for example, be of the type described in U.S. Pat. No. 4,153,998 (McMurtry). When a tip of such a probe contacts a point on an article, the occurrence of the contact triggers the production by a computer of an indication of co-ordinates of that point using the output of the co-ordinate measuring unit. On a machine tool, such a probe may be used in controlling the manufacture of an article to a given shape and given dimensions. On a CMM, it may be used in checking a dimension of an article after it has been manufactured. For example, in the latter use, an operator causes the tip of the probe to contact certain points on an article, to obtain the co-ordinates of the points. These co-ordinates may then, for example, be processed by the computer to compute that dimension of the article. However, in known systems, it is necessary for the operator to inform the computer of the geometrical shape of the article or relevant part of the article, the computer only being able to compute the relevant dimension on the basis of a knowledge of that shape as well as the co-ordinates of the various points.

SUMMARY OF THE INVENTION

According to the present invention from one aspect, there is provided a method of inspecting an article using co-ordinate positioning apparatus comprising a fixed part, a movable part, co-ordinate measuring means for providing outputs indicative of the relative positions of the fixed and movable parts, and probe means mounted on one said part for sensing points on a said article mounted on the other said part, the method comprising:

moving the probe means relative to the article, towards points on the article;

using outputs of the co-ordinate measuring means to detect the direction of relative movement of the probe means towards each of said points;

determining co-ordinates of each of said points in response to the probe means and outputs of the co-ordinate measuring means; and on the basis of said directions, making a decision concerning the geometrical shape of said article or part of said article.

According to the present invention from another aspect, there is provided apparatus for use in inspecting an article, the apparatus comprising a co-ordinate positioning apparatus having a fixed part, a movable part and co-ordinate measuring means providing outputs indicative of the amount of relative movement between the two parts; probe means mounted on one said part of the co-ordinate positioning apparatus for relative movement towards points on an article on the other said part to sense such points; said probe means providing a signal indicative of such sensing; and computing means arranged to use outputs of the measuring means to (a) detect the direction of relative movement of the probe means towards each of said points, (b) determine co-ordinates of each of said points in response to the probe means and outputs of the co-ordinate measuring means, and (c) on the basis of said directions, make a decision concerning the geometrical shape of said article or part of said article.

BRIEF DESCRIPTION OF THE DRAWINGS

Examples of the present invention will now be described, with reference to the accompanying drawings, in which:

FIG. 3 is a flow chart showing the operation of a computer in FIG. 1 in a first example of the invention;

FIG. 4 and 5 are flow charts showing routines called from FIG. 3;

FIGS. 6, 7a, 7b, 8a and 8b are flow charts showing respective operations of the computer in response to FIG. 5;

FIG. 8c is a flow chart showing a possible operation of the computer following on from FIG. 8a; and FIGS. 9, 10, 11 and 12 are flow charts illustrating various ways in which the first example of the invention can be modified.

DESCRIPTION OF PREFERRED EMBODIMENTS

Figure 1:
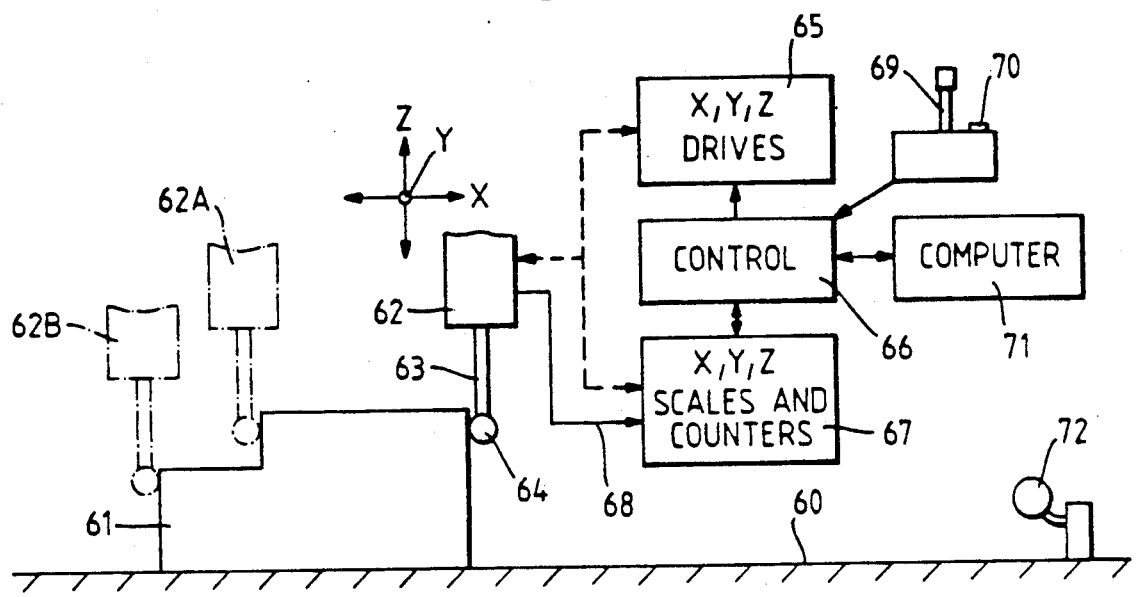
FIG. 1 is a schematic diagram of a co-ordinate measuring machine (CMM) for performing an example of the invention.

The CMM shown in FIG. 1 comprises a table 60 upon which may be placed an article or workpiece such as a manufactured part 61 which is to be inspected. The CMM also comprises a touch trigger probe 62 of the type described in U.S. Pat. No. 4,153,998 (McMurtry), which has a removable stylus 63 with a spherical tip 64 for contacting the part 61. The probe 62 is mounted in a quill (not shown) of the machine for movement in three orthogonal directions X, Y and Z, under the action of X, Y and Z drives 65, controlled by a numerical machine control 66. X, Y and Z scales 67, (which include counters for the outputs of the scales) show the instantaneous co-ordinates of the position in three dimensions of the quill in which the probe 62 is mounted. When the probe 62 sends a trigger signal on a line 68 indicating that it has contacted the surface of the part 61, the counters of the scales 67 are frozen and the control 66 takes a reading of the X, Y and Z co-ordinates of the machine quill.

The machine as so far described is generally conventional. To aid the understanding of the examples of the present invention described below, the conventional manner of use of such a machine will now be described.

The probe 62 is moved to contact the surface of the part 61 at a plurality of different points, sufficient to take all the required dimensions for the inspection operation required. This is illustrated at 62A, 62B. The probe may be moved by the drives 65 under the influence of a manually-operated joystick 69 connected to the control 66. Alternatively, it may be moved in accordance with a program stored in the control 66—since such a program is specific to the inspection of a particular set of identical manufactured parts 61, it is termed a "part program". The part program includes all the moves and touches of the surface of the part 61 required for the inspection operation, and is generally written in a language specific to the machine control 66. In another alternative system, the probe 62 is moved into the various contact positions by direct manual manipulation of the quill in which it is mounted—this would be the case in a simpler machine with no joystick 69 and perhaps with no drives 65 and a non-programmable control.

An inspection operation conventionally requires both the probe stylus and the part 61 to be datumed.

Datuming the probe stylus (or "stylus qualification" as it may be termed) is carried out whenever a different stylus is fitted on the probe, or at the start of the working day and possibly at intervals during the day. It involves touching the stylus tip 64 at a plurality of points on the surface of an accurately spherical datum ball 72 fixed at a convenient position relative to the table 60. Co-ordinate readings of the touched points are taken, and knowing the radius of the ball 72, offsets are calculated and stored relating to the effective radius of the stylus tip 64 in each direction of interest. These offsets are used to compensate subsequent readings on parts 61, so that the radius of the stylus tip and the triggering characteristics of the probe do not affect the accuracy of the measurement results. If desired, the centre of the ball 72 can be calculated from the readings, and all subsequent measurements referenced to it.

Figure 2:
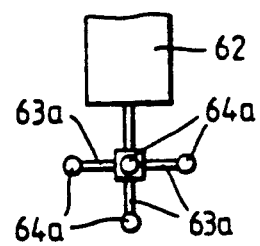
FIG. 2 shows a probe similar to one shown in FIG. 1 but with a different stylus assembly.

FIG. 2 illustrates another kind of stylus which may replace the stylus 63 in FIG. 1. This is a so-called star stylus, having five branch styli 63a extending in different directions, with five stylus tips 64a (only four of which are visible in the figure). As is well known, this increases the flexibility of use of the probe 62 for measuring articles with a complex shape. Each stylus tip 64a will require separate qualification as described above before use. The set of offsets resulting from qualification of each stylus is stored so that it can be selected for use when compensating the co-ordinate readings taken with that stylus. It will be understood that there are numerous other possible stylus configurations which can be used, apart from those shown in FIGS. 1 and 2.

Part datuming is intended to allow for the fact that when a part 61 is placed on the table 60, it can never be positioned and orientated in a precisely predetermined way. Accordingly, certain surfaces of the part will be designated as reference or datum surfaces, and will be measured first in order to determine the position and orientation of the part. This information is stored, and used to correct subsequent readings on the part so that they can be referenced to the datum position and orientation.

The following simple example of the present invention uses the CMM of FIG. 1 for checking a critical geometrical parameter or parameters of various forms of articles 61 after they have been manufactured by an automatic machine tool—for example, the diameter of a bore or a boss in or on an article; the thickness of a flange or the width of a slot on or in the article; or the diameter of a spherical surface on or in the article. A computer 71 (which may for example be an IBM-compatible personal computer) computes the relevant parameter or parameters without being informed by the user of the machine of the particular geometrical shape of the article or part of the article. Rather, the user uses the probe 62 to contact the article in a predetermined manner depending on the particular geometrical shape. The control 66 passes the resulting co-ordinate data to the computer 71. From this data, the computer makes a decision concerning the geometrical shape and, on the basis of that decision and the co-ordinates of various points on the article, the computer computes the relevant geometrical parameter or parameters. The control 66 and computer 71 could of course be combined as a single computer if appropriate processing power is available.

FIG. 3 shows the routine followed by the computer 71 in order to measure a geometric feature of an article in the above manner. The items shown in broken lines will not be described here, since they are features of a more sophisticated example described below, and are not essential to the present example. The routine of FIG. 3 could for example be called from a menu on a screen of the computer 71, though a more preferable alternative will be described below since we prefer to provide a system in which the user has little or no need to enter information directly into the computer 71.

At the start of the FIG. 3 routine, in step 80, the computer sets a software counter to zero. This counter is used to keep track of the number of points on the geometric feature of the article which have been touched. The user then moves the probe freely (step 81), using the joystick 69 or directly manipulating the quill of the machine, until he is ready to begin a probing move, in which a selected contact point on the surface of the article will be touched. The probing move starts from a position in which the stylus tip 64 lies approximately on a line passing through the selected contact point, normal to the surface of the article.

The joystick 69 has a number of buttons 70 (only one of which is seen in FIG. 1). The user signals the start of the probing move by pressing one of the buttons 70 (step 83). This button could of course be located elsewhere, e.g. on a keyboard of the computer 71, but this is not preferred because of our desire that the user should have as little need as possible to address the computer 71 directly. When the button 70 is pressed, the control 66 signals this fact to the computer, and also passes on the current X, Y, Z co-ordinates of the probe.

In step 84, the computer 71 now enters a routine to measure the selected point on the surface of the article. This is described below in relation to FIG. 4. Next, in step 85, the computer sees whether the information collected from points so far contacted and measured has been sufficient to enable it to reach a decision on the shape of the feature of the article which is being inspected. This decision routine is described below in relation to FIGS. 5 to 8, as also is the nature of the action taken for specific shapes. The decision routine 85 returns with a flag set to show whether a decision has been reached.

If a decision has been reached, then in step 86 the computer 71 displays the decision to the user, and asks him to confirm it. The user does this by pressing one of the buttons 70 on his joystick 69, or alternatively he presses a different button 70 if the decision reached by the computer is not what he intended. If the user confirms that the desired decision has been reached, then the FIG. 3 routine is completed. If not, or if no decision has been reached, then the program loops back from step 86 to step 81 to gather information on a further point of contact. It is also possible, in step 86, for the user to press an appropriate button 70 even where no decision has been reached, e.g. if only a single point has been measured (in this case, the computer will be displaying the co-ordinates of that point, as discussed below). Pressing such a button 70 in these circumstances causes the computer to exit the FIG. 3 routine, storing the details, without looping back to gather more information.

It is possible for the computer to make the decision of step 86 by itself, purely on the basis of whether the flag has been set by the routine 85, and to exit the FIG. 3 routine or loop back to step 81 accordingly. However, the above procedure of asking the user to confirm the computer's decision leads to greater reliability and flexibility.

FIG. 4 shows the routine followed by the computer 71 to measure a selected point. This routine starts up when the user has pressed the button 70 in step 83 of FIG. 3, and the first action (step 90) is to read in and store the co-ordinates of the probe, which are passed to the computer by the control 66 at this time as already mentioned.

The decision routine described below needs to have a vector describing the direction of movement of the stylus tip 64 as it is brought in to touch the point of contact. So the user next moves the probe 62 in that direction, towards that point. It would be possible to have the user move the probe 62 until the contact is made, whereupon the probe would signal this event on the line 68 and the X, Y, Z co-ordinates of the point of contact would be taken by the control 66 and passed to the computer 71. The computer could then calculate the necessary vector from the co-ordinates stored at step 90 and those of the point of contact.

However, the probe used is capable of greater repeatability if it always contacts the article at a known, constant, low speed. So the routine of FIG. 4 requires the user to move the probe part of the way towards the point of contact, and then press the button 70 again (step 91). The new co-ordinates of the probe are then passed from the control 66 to the computer 71 (step 92). The computer then calculates the required vector by subtracting these co-ordinates from those stored at step 90, and stores the result for future use (step 93).

Next, in step 94, the computer instructs the control to move the probe along the calculated vector at the desired low constant speed until the selected point is contacted, as indicated by a trigger signal on line 68. The computer reads the co-ordinates corresponding to the point of contact. It stores them in step 95, and also displays them on its screen. Finally, the point counter (which was zeroed at step 80, FIG. 3) is incremented so that it keeps an up-to-date record of the number of points measured (step 96). Control now returns to FIG. 3 (the step 97 shown in broken lines being only included in the more sophisticated example to be described below).

The required vector could alternatively be obtained as follows. As the probe 62 is moved by the user, the co-ordinates of successive positions of the tip 64 are continually registered in a register in the control 66 or in the computer 71, which register only holds, for example, the co-ordinates of the two or three most recent of a series of successive positions. When the tip 64 of the probe 62 contacts a point on an article, the register will register the co-ordinates of the point on the article and, for example, the one or two immediately preceding positions before the tip contacted the point. If the register holds only the co-ordinates of the contact point and one preceding position, the computer 71 calculates the vector on the basis of the difference between the registered co-ordinates. If it holds the contact point and two or more preceding positions, the vector can be calculated on the basis of a best fit through the various positions.

In using the apparatus, the user must ensure that (a) he moves the probe 62 so that its tip 64 has a vector of movement, immediately before making contact with a point on the surface of the article, which is perpendicular to that surface; and (b) he causes the tip 64 to contact a number of points from respective directions in dependence on the geometrical shape of the article or part of the article whose parameter or parameters is or are to be checked. This will become more apparent from the following description with reference to FIGS. 5 to 8 of the decision routine carried out by the computer 71 on the basis of the stored data concerning the co-ordinates of the points of contact and the vectors of movement of the tip 64 in making contact with the article at those points. However, all the decisions taken in this routine as to the directions of the various vectors can have a predetermined in-built tolerance, so that the user does not have to move the probe exactly in accordance with these conditions (a) and (b), but only approximately so.

In the following description of FIGS. 5 to 8, items shown in broken lines are once again not essential to the present example. They relate to further examples described below, and will not be discussed here.

Figure 5:
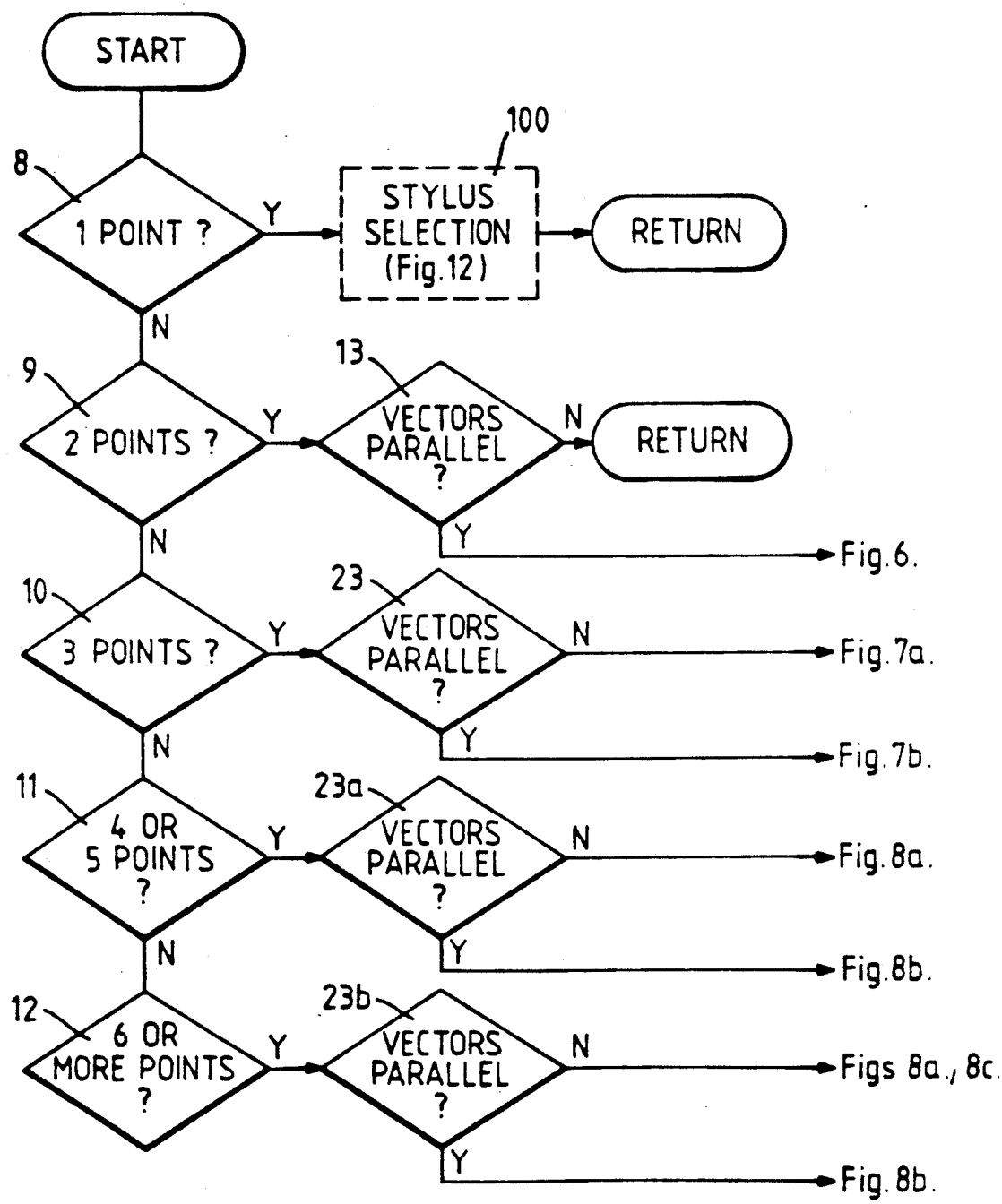

Referring to FIG. 5, first, in step 8, the computer 71 examines the point counter and determines "Was there only one point of contact?" If the answer if Yes (Y), then the computer 71 merely returns to FIG. 3, with the flag set to show that no decision can be reached about the shape of the feature being inspected. If the answer is No (N) the computer 71 proceeds to step 9 and determines "Were there two points of contact?" If the answer is Y, it next decides whether the vectors corresponding to these points were mutually parallel (step 13). If the answer is again Y, then the computer 71 proceeds according to the flow chart of FIG. 6; whereas, if the answer is N, no decision can be reached and it returns to FIG. 3 with the flag set accordingly.

Figure 7A:
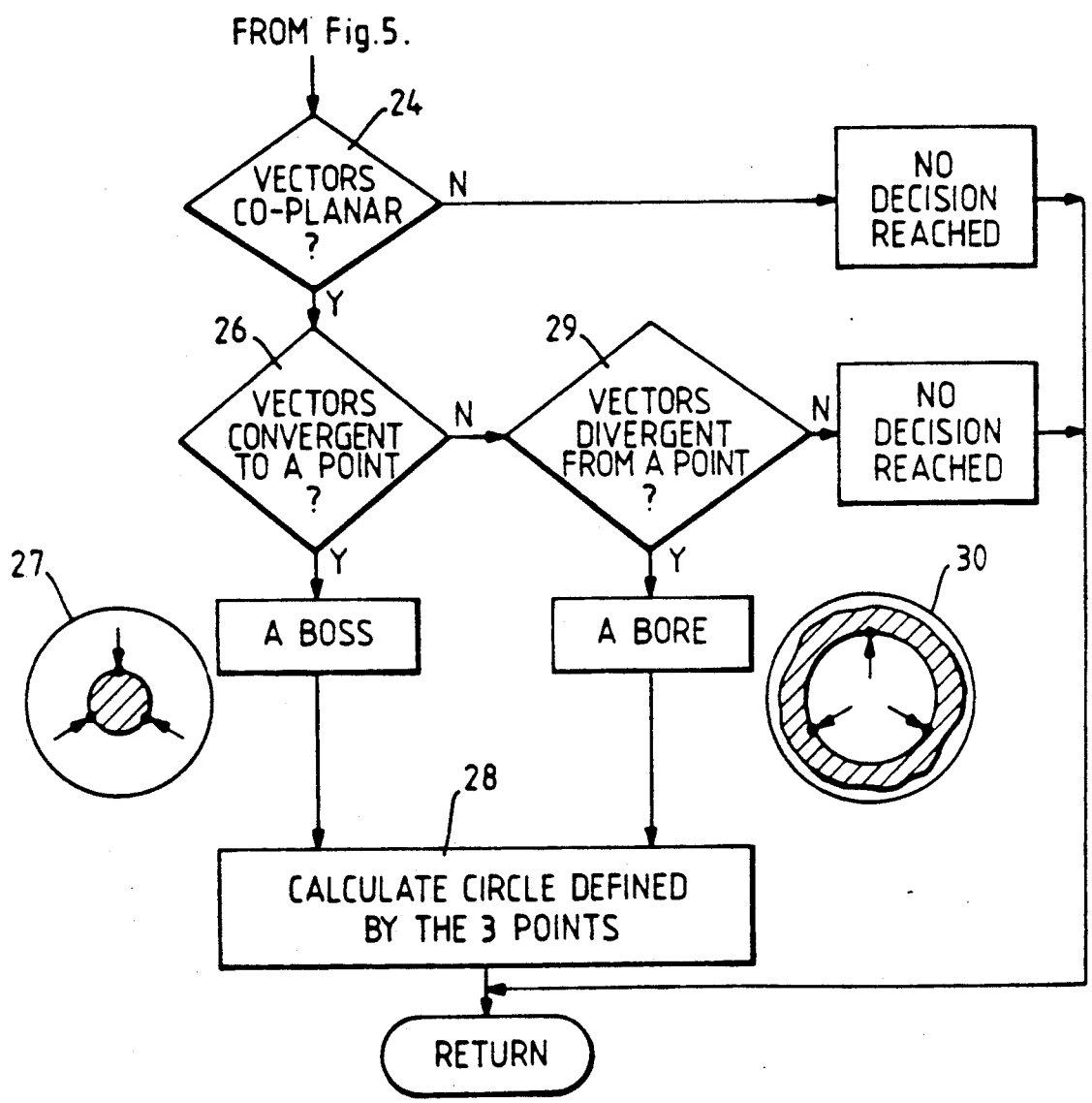
Figure 7B:
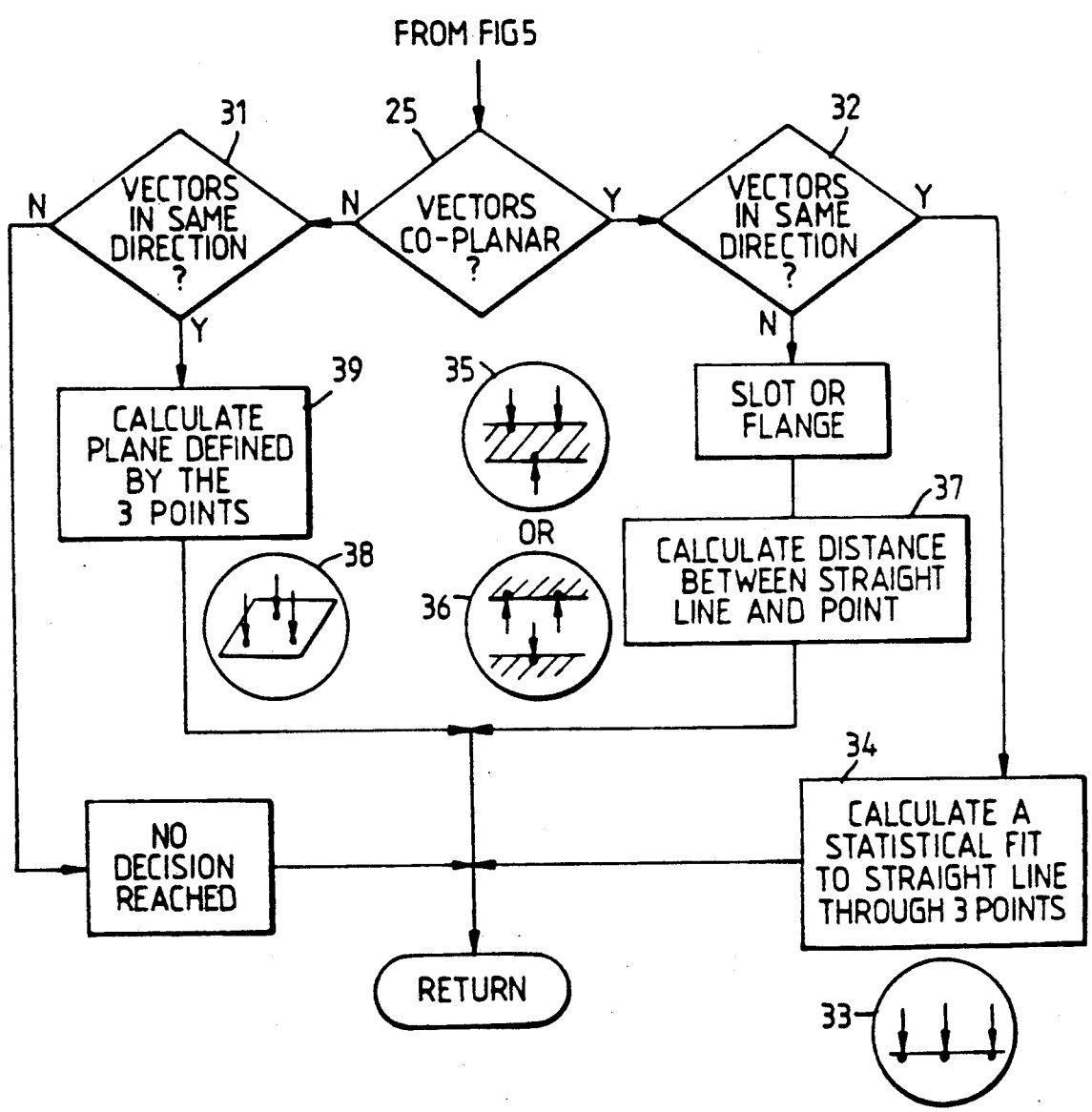

If there were more than two points of contact, the computer proceeds to step 10 and determines "Were there three points of contact?" If the answer is Y, then the computer 71 again determines whether the corresponding vectors were mutually parallel (step 23) and proceeds according to FIG. 7a if they were not, or FIG. 7b if they were. If there were more than three points, the computer 71 proceeds to step 11 and determines "Were there four or five points of contact?" If the answer is Y, then the computer again determines if the vectors were mutually parallel (step 23a) and proceeds according to the flow chart of FIG. 8a if N, or FIG. 8b if Y. If there were more than five points, the computer 71 proceeds to step 12 and determines "Were there six or more points of contact?" If the answer is Y, then the computer 71 again determines whether the vectors were parallel (step 23b). If they were, the computer again proceeds in the manner of FIG. 8b, while if they were not it proceeds in a manner similar to FIG. 8a, but with the addition of the procedure of FIG. 8c.

Figure 6:
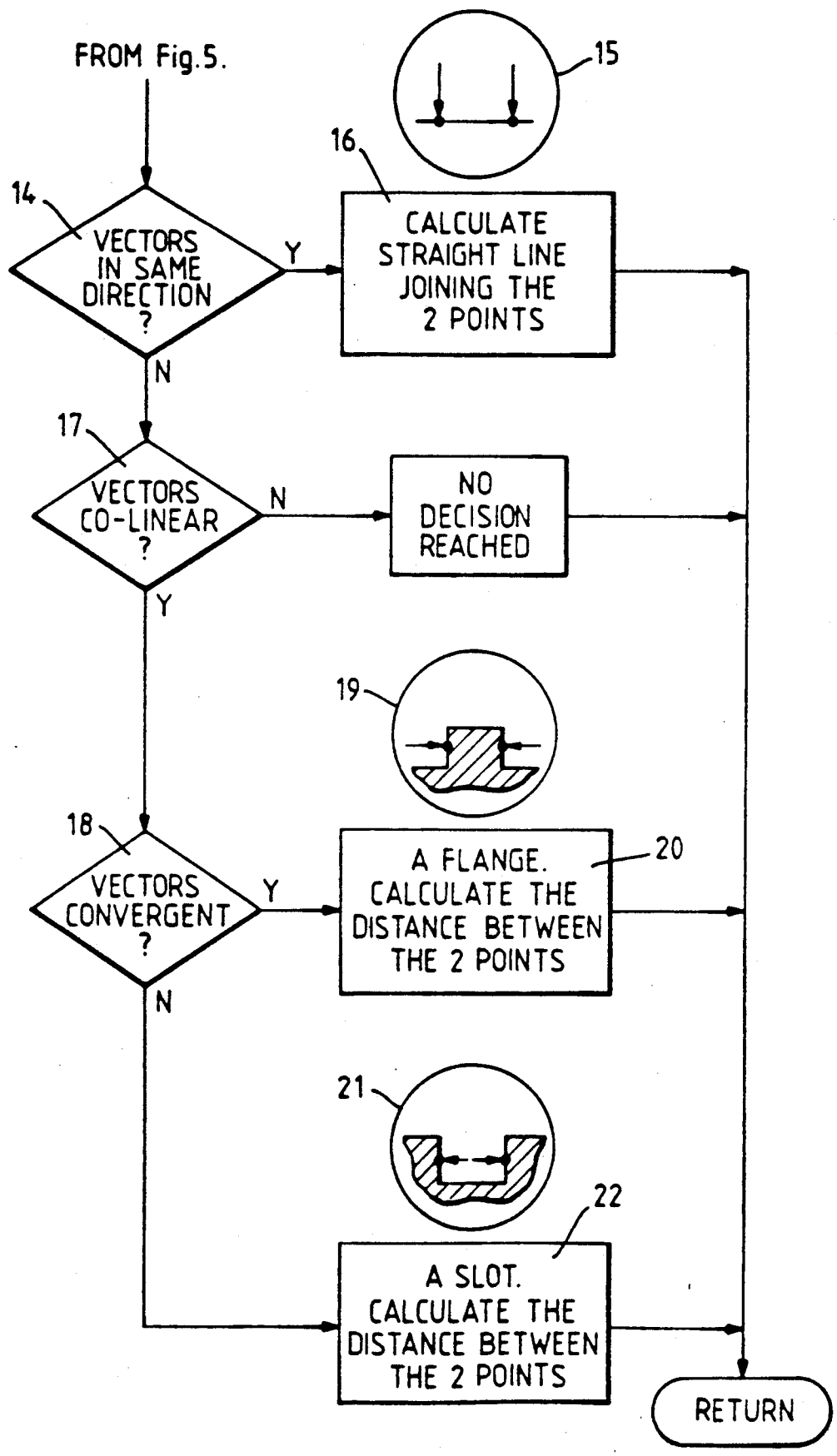

When the computer 71 is proceeding according to the flow chart of FIG. 6 (two points of contact, vectors parallel), first, in step 14 the computer determines "Were the vectors in the same direction?" If the answer is Y, then the computer 71 decides that the two probe movements must have been as indicated by the arrows in detail 15 and, in step 16, calculates the straight line joining the two points of contact, for future use. By itself, however, this straight line does not enable a decision to be made as to the shape of the geometrical feature under inspection, and so the flag is set accordingly as the program flow returns to FIG. 3, so that a further point will ordinarily be measured. However, of course, the user has the option (in step 86, FIG. 3) of indicating to the computer that a straight line was what he intended to measure.

If the answer in step 14 is N, then the computer 71, in step 17, determines "Were the vectors co-linear?" If the answer is N, then the computer 71 concludes that no decision can be reached, and returns with the flag set accordingly. If the answer is Y, then the computer 71 proceeds to step 18 and determines "Were the vectors convergent?" If the answer is Y, then the computer 71 decides that the article or part of the article is a flange, that the directions of movement of the probe were as shown by the arrows in detail 19 and, in step 20, calculates the distance between the two points of contact. If the answer in step 18 is N, then the computer 71 decides that the part of the article of concern is a slot, the directions of movement of the probe were as shown by the arrows in detail 21 and, in step 22, calculates the distance between the two points of contact. Thus, in these cases, the geometric parameter which is calculated by the computer, once the shape of the feature under inspection has been determined to be a flange or slot, is the thickness of the flange or the width of the slot. After either step 20 or step 22, the program flow returns to FIG. 3 with the flag set to show that a decision has been reached and a feature has been identified and measured.

When the computer 71 is operating according to the flow chart of FIG. 7a (three points of contact, vectors not parallel), in step 24 the computer determines the question "Were the vectors co-planar?" If the answer is N, then the computer 71 concludes that no decision can be reached; whereas, if the answer is Y, it proceeds to step 26, where it determines the question "Were the vectors convergent to a point?" If the answer is Y, then the computer 71 decides that the article or part of the article is a boss, the tip 64 of the probe 62 having been moved in the directions shown by the arrows in detail 27, and, in step 28, the computer 71 calculates the circle defined by the three points of contact, e.g. in terms of desired geometrical parameters of the boss such as its location and diameter. If the answer in step 26 is N, then the computer 71 proceeds to step 29 where it determines the question "Were the vectors divergent from a point?" If the answer is N, then the computer 71 concludes that no decision can be reached; whereas, if the answer is Y, the computer 71 decides that the part of the article of concern is a bore, the tip 64 of the probe 62 having been moved in the directions shown by the arrows in detail 30, the computer 71 then proceeding to step 28 where it calculates the circle defined by the three points of contact, e.g. in terms of geometrical parameters of the bore such as its diameter and location. In any case, the computer returns from FIG. 7a with the flag set to show whether or not a decision has been reached.

When the computer 71 is operating according to FIG. 7b (three points of contact, vectors parallel), it first determines "were the vectors co-planar? (step 25). If the answer is N, then the computer proceeds to step 31 where it determines the question "Were the vectors in the same direction?"; whereas if the answer is Y, the computer proceeds to step 32, where it also determines the question "Were the vectors in the same direction?" If the answer in step 32 is Y, then the computer 71 decides that the tip 64 of the probe 62 contacted three points on a straight line, the directions of movement of the tip 64 of the probe 62 having been as shown by the arrows in detail 33, and the computer, in step 34, calculates a statistical fit to the straight line through the three points. In this step, use can be made of the calculation performed in step 16, FIG. 6. If the answer in step 32 is N, then the computer 71 decides that the article or part of the article is a flange or slot, the directions of movement of the tip 64 of the probe 62 having been as shown by the arrows in detail 35 or 36. The computer 71 decides whether the feature is a flange or a slot in a similar manner to step 18, FIG. 6, and proceeds to step 37 where it calculates the distance between the straight line defined by the two points having the same direction and the other point. This gives the thickness of the flange or width of the slot, as previously. If the answer in step 31 in N, then the computer 71 concludes that no decision can be reached; whereas, if the answer is Y, the computer 71 decides that the part of the article was a plane, the directions of movement of the tip 64 of the probe 62 having been as shown by the arrows in detail 38, the computer 71 proceeding to step 39 where it calculates the plane defined by the three points. In all of the above cases the program returns to FIG. 3.

Figure 8A:
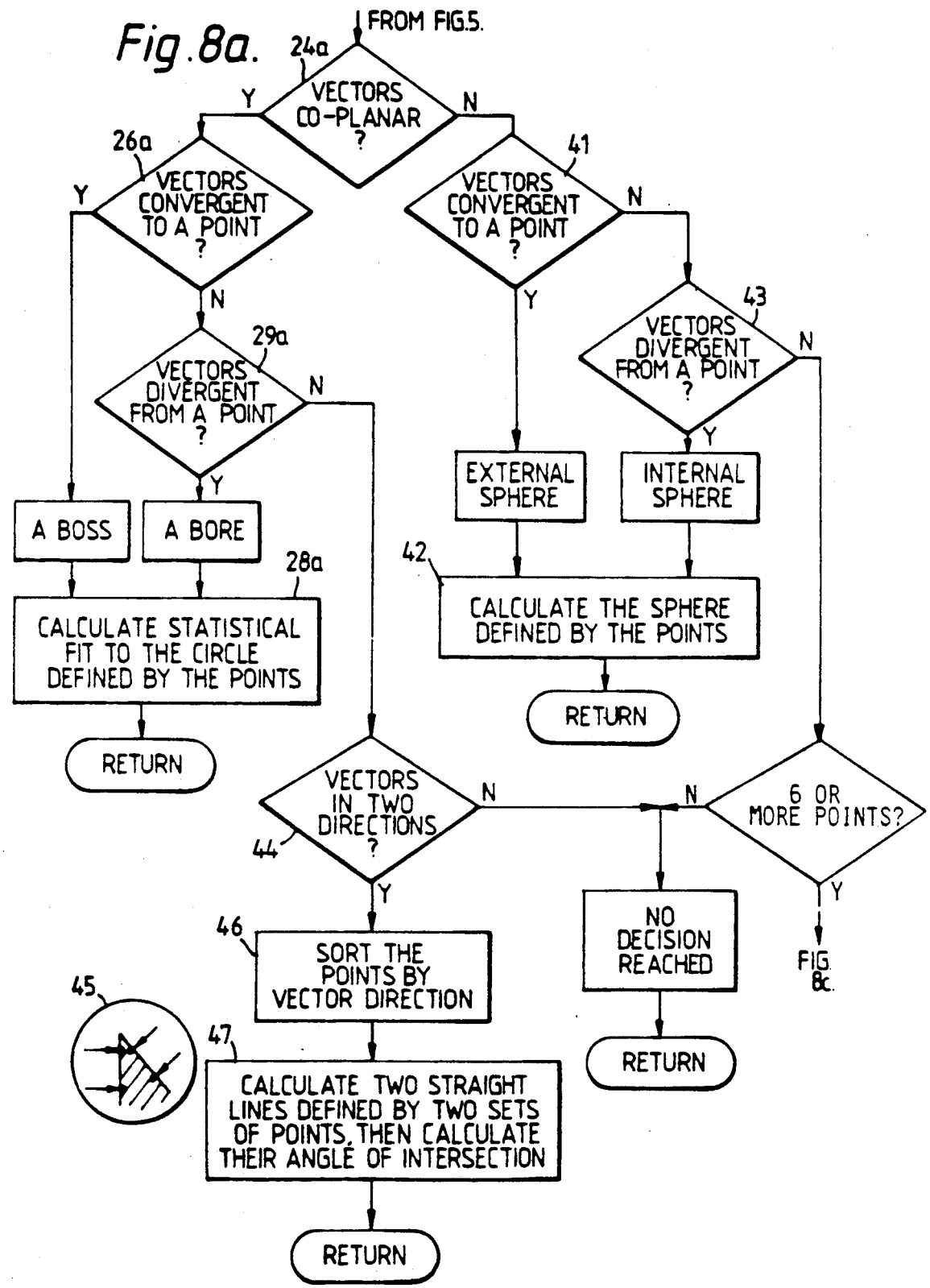
Figure 8C:
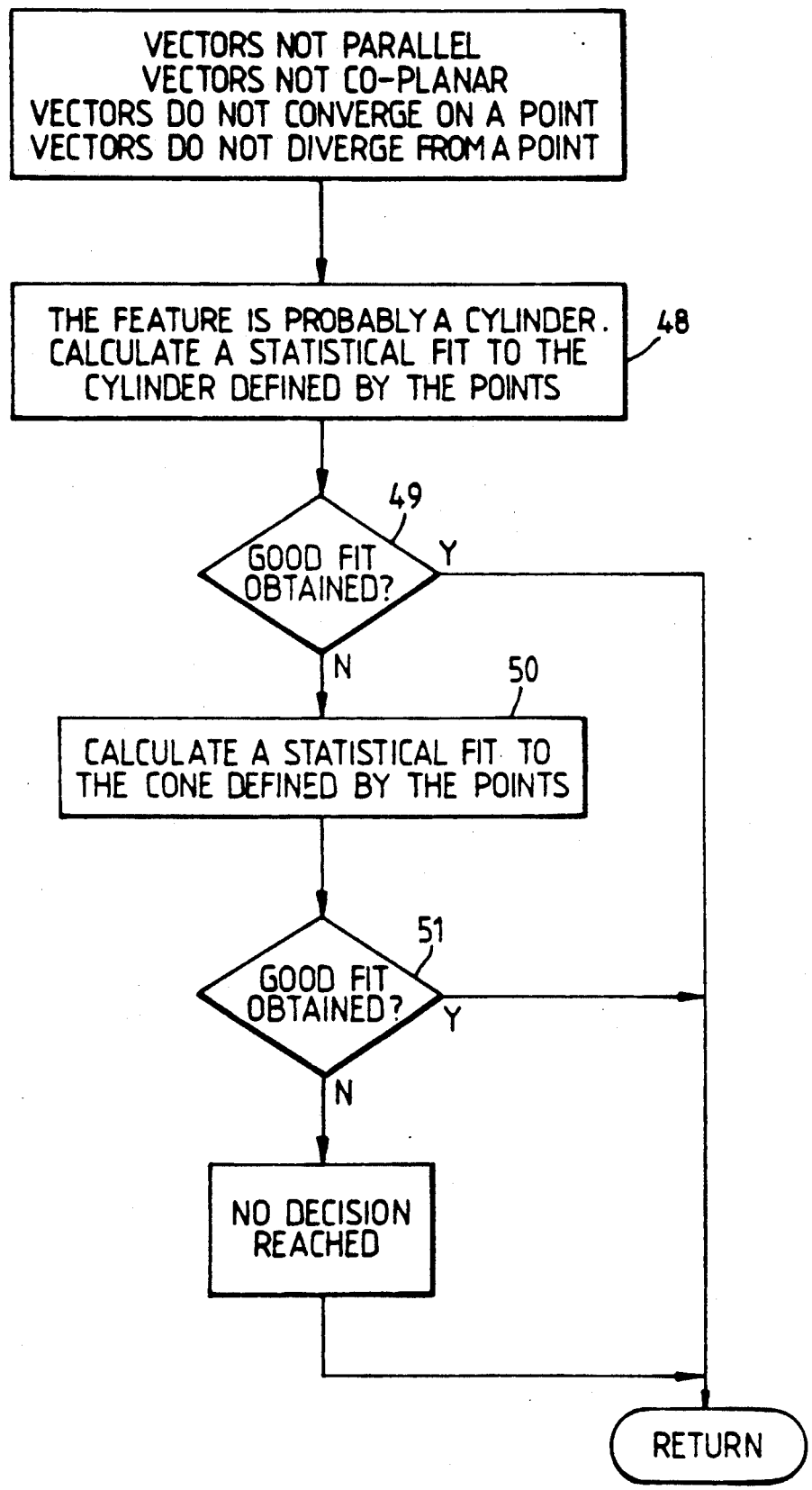

The flow charts of FIGS. 8a and 8b (four or five points of contact) include functional steps which correspond with the functional steps in FIGS. 7a and 7b, each step which corresponds having been given the same reference numeral as in FIGS. 7a and 7b but with the suffix a. In step 28a, (FIG. 8a), the computer calculates a statistical fit to the circle defined by the four or five points, giving desired geometrical parameters as previously; in step 37a, (FIG. 8b), the computer calculates the two straight lines or the single straight line and single point defined by the two sets of points and then calculates their separation (the step 37a being preceded by a step 40 in which the vectors are sorted by direction); and in step 39a, (FIG. 8b), the computer 71 calculates the statistical fit to the plane through the four or five points. However, the flow chart of FIG. 8a includes further steps whereby the computer 71 can decide if the article or part of the article comprises a spherical surface or two planes at an angle to one another, as follows. If the answer in step 24a is N, then the computer 71 proceeds to step 41, where it determines the question "Were the vectors convergent to a point?" If the answer is Y, the computer decides that the article or part of the article is an external spherical surface and proceeds to step 42, where it calculates the sphere defined by the four points or a statistical fit to the sphere defined by the five points (e.g. in terms of geometric parameters such as the radius of the sphere and the co-ordinates of its centre). From step 42, the program returns to FIG. 3. If the answer in step 41 is N, then the computer 71 proceeds to step 43 where it determines the question "Were the vectors divergent from a point?" If the answer is N, then the computer concludes that no decision can be reached in the case of four or five points; whereas, if the answer is Y, the computer decides that the article or part of the article is an internal spherical surface and proceeds to step 42, where it calculates the sphere defined by the four points or a statistical fit to the sphere defined by the five points, also in terms of geometrical parameters. If the answer in step 29a is N, then the computer proceeds to step 44, where it determines the question "Were the vectors in two directions?" If the answer is N, then the computer concludes that no decision can be reached and returns to FIG. 3; whereas, if the answer is Y, the computer decides that the article or part of the article comprises two planes at an angle to one another, the direction of movement of the tip 64 of the probe 62 having been as shown by the arrows in detail 45. In step 46, the computer 71 sorts the points by vector direction and, in step 47, calculates the two straight lines defined by the two sets of points and then calculates their angle of intersection. The program then returns to FIG. 3.

If there are six points of contact (step 12, FIG. 5), the computer again determines if the vectors were parallel (step 23b), and proceeds through routines corresponding to those for four or five points of contact, as described in FIGS. 8a and 8b, except that in contrast to the cases where there are four or five points, a decision may be reached if the answer in step 43 of FIG. 8a is N. More particularly, when the computer 71 is operating with six points of contact and the answer in step 43 is N, (that is, the vectors are not parallel, not co-planar, do not converge to a point and do not diverge from a point), the computer 71 proceeds according to FIG. 8c in which, in step 48, it decides that the article or part of the article is probably a cylinder and calculates a statistical fit to the cylinder defined by the six points.

Computer 71 then proceeds to step 49 in which it determines the question "Is a good fit obtained?" If the answer is Y, then the computer assumes that the article or part of the article is indeed a cylinder whereas, if the answer is N, the computer proceeds to step 50 where it calculates a statistical fit to the cone defined by the six points. In step 51, the computer determines "Is a good fit obtained?" If the answer is Y, then the computer assumes that the article or part of the article is a cone whereas, if the answer is N, the computer concludes that no decision can be reached. In any case, it returns to FIG. 3 with the flag set accordingly.

In the simple example described above, no action is taken if only a single point has been measured: the computer 71 returns straight back to FIG. 3 from the decision step 8 in FIG. 5. However, FIG. 12 illustrates a useful addition in the case where the user might wish to use multiple styli, such as the star stylus of FIG. 2. With this addition to the program, if the answer to step 8 is Y, then the computer proceeds to FIG. 12 before returning to FIG. 3, as shown in broken lines at 100. The FIG. 12 routine permits the user to indicate to the computer that he intends to use a different stylus 63a for a succeeding measurement or measurements simply by touching the datum ball 72 once with the desired stylus tip 64a. Thus, the user can select a stylus without having to input information directly through the keyboard of the computer 71. The computer keeps a record of which stylus was most recently selected in this manner, so that it can correct each co-ordinate reading received from the control 66 with the appropriate set of offsets stored when that stylus was qualified. Alternatively, it may simply instruct the control 66 to carry out the necessary corrections with the appropriate set of offsets.

When the computer is proceeding in accordance with the flow chart of FIG. 12, it first decides whether the measured point was near the datum ball 72 (step 101). This decision is taken with quite a wide tolerance, to allow for the separations of the various stylus tips 64a which might have touched the datum ball. If the point was not near the datum ball, then clearly the user was not wanting to select a stylus, and so the program simply returns back to FIG. 3 (via FIG. 5) to allow the user to measure more points.

If the answer in step 101 is Y, then in step 102 the computer 71 runs through the stored offsets for each stylus which has already been qualified, and calculates the distance between the centre of each such stylus and the centre of the datum ball. It does this until it finds a stylus which this calculation indicates is exactly touching the datum ball (step 103). Once this stylus has been found, then in step 104 the computer selects that stylus, by altering its record of the selected stylus or by instructing the control 66. All subsequent measurements will now use the appropriate offsets for the selected stylus for compensation. The program then returns to FIG. 3 via FIG. 5.

If step 103 shows that no previously qualified stylus is touching the datum ball, then the user must be trying to select a new stylus which the computer does not yet know about. Accordingly, in step 105, the computer recognises the existence of a new stylus and selects it. However, there are of course no stored offsets for this stylus, so first of all the stylus needs to be qualified. The computer can either prompt the user to carry out the necessary sequence of touches on the datum ball 72 to achieve this, or preferably it can carry out this sequence itself automatically. This simply requires a part program stored in the control 66 to be called up, or a simple command in the control's language, to perform the necessary touches on the datum ball, starting from the position at which the user touched it. The offsets are then calculated in the conventional manner. Once the stylus is qualified, the offsets obtained are used to correct the co-ordinate readings taken with the new selected stylus. The program then returns to FIG. 3 via FIG. 5.

So far, the routine of FIGS. 3 to 8 has been described as standing alone, e.g. being called from a menu on the screen of the computer 71 whenever a new feature is to be measured. This is indeed a useful system, with the advantage that once called, the computer is able to decide on the shape of the feature being inspected and carry out the calculation of the associated geometric parameter(s) (such as width, diameter etc.) purely on the basis of the probe movements and touches made by the user, without direct keyboard input to the computer. The menu may include other options for selection by the user, such as stylus qualification, part datuming, etc.

However, more sophisticated examples of the invention will now be described with reference to FIG. 9. This figure shows a routine which, at its simplest (ignoring the various optional items shown in broken lines), simply calls the FIGS. 3 to 8 routine repeatedly in a loop (step 111) in order to allow the user to measure successive features of a part 61.

The optional items which can be added, separately or together, in order further to reduce the need for the user to address the computer 71 directly, are as follows.

Figure 9:
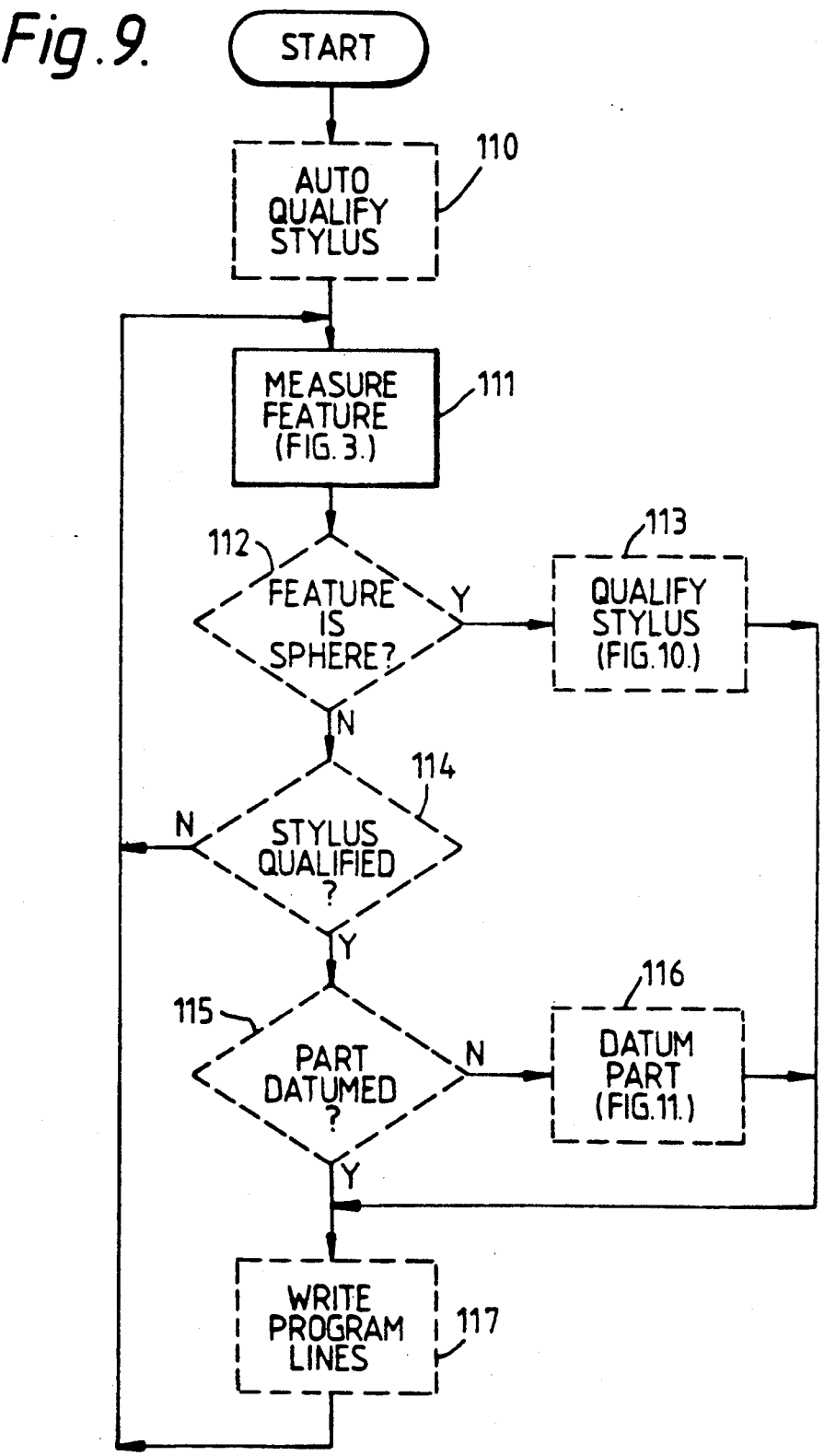

When the computer first enters the FIG. 9 routine (e.g. when the machine is first switched on if the FIG. 9 routine is incorporated as a turnkey system), the computer may assume that the user will qualify a stylus before he does anything else. In step 110, therefore, it can prompt the user to commence qualifying a stylus by touching the datum ball 72 with it. The computer then proceeds in a similar manner to that described in respect of step 105, FIG. 12, in order to qualify the stylus automatically. Indeed, step 110 may not be necessary if step 105 is included in the system, since as soon as the user touches the datum ball after first entering the FIG. 9 routine, the ordinary flow of the routines already described will in any case lead to step 105 (because no styli have been qualified at all at this time).

Another optional feature starts at step 112, after the measurement of a feature by the routines of FIGS. 3 to 8. Here, the computer checks whether the feature measured was an external sphere. If so, it proceeds to a routine 113 shown in more detail in FIG. 10, in order to decide whether the user is wanting to qualify a stylus. If the feature is not an external sphere, the computer carries on round the FIG. 9 loop.

Figure 10:
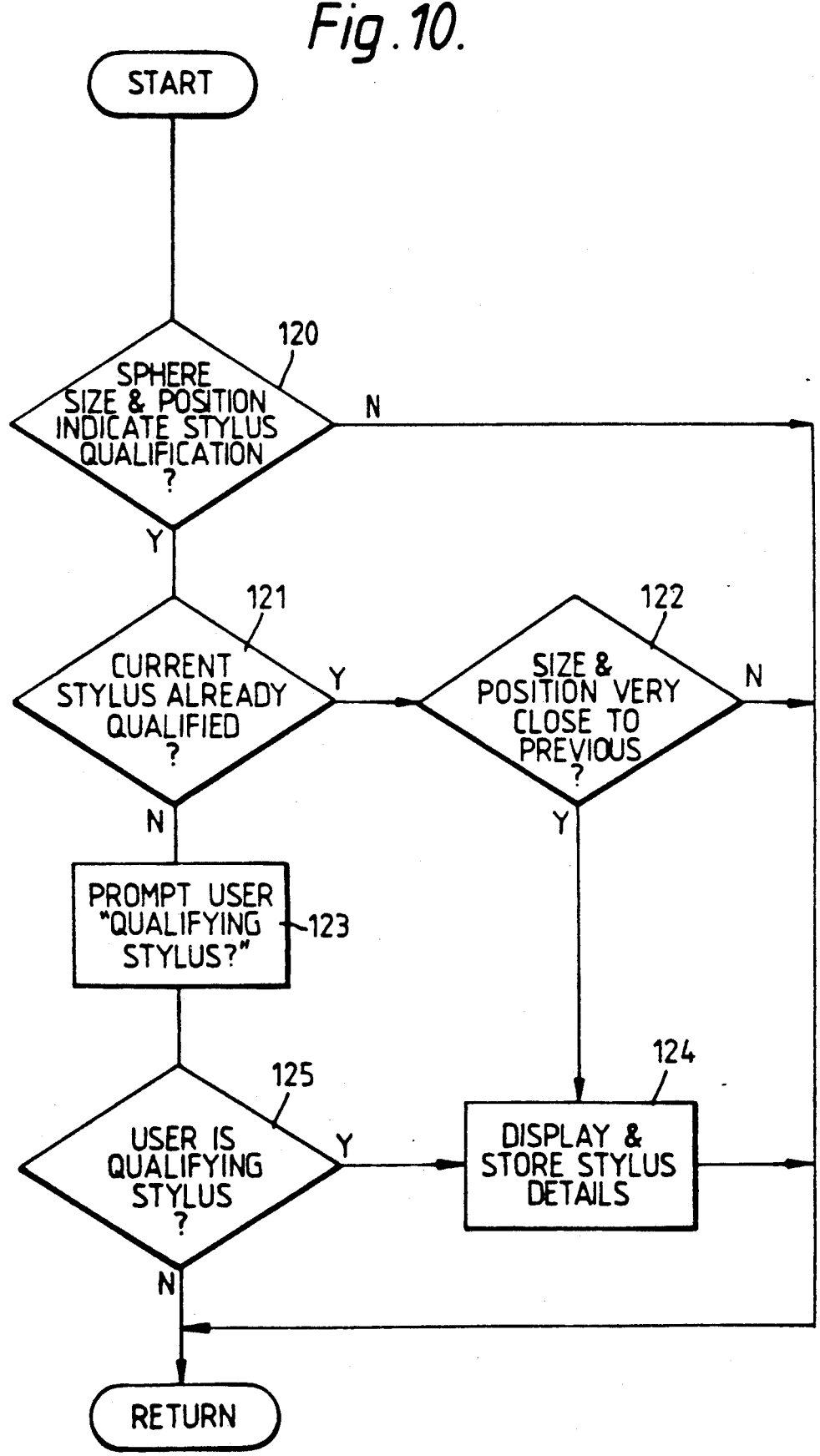

At step 120 in FIG. 10, the computer decides whether the size and position of the external sphere measured are compatible with the datum ball 72 (within a reasonably wide tolerance of position, to allow for the separation of stylus tips such as those shown in FIG. 2). If they are not compatible with the datum ball, then clearly the user does not require stylus qualification, and so the program returns back to the FIG. 9 loop. If they are compatible, this indicates that the user requires stylus qualification, and so the computer checks to see whether the stylus currently selected has already been qualified (step 121). If it has, in step 122 the computer checks that the size and position of the datum ball as just measured is very close to the size and position as measured when the stylus was previously qualified. If the answer is Y, this indicates that the user is wishing to update the stylus qualification (e.g. to take account of any drifting of the CMM) and so in step 124 the computer stores details of the newly-measured offsets for the stylus in place of the previous ones. These details can also be displayed. If the answer to step 122 is N, the computer concludes that the user cannot be wishing to re-qualify the current stylus, and so returns to FIG. 9, perhaps displaying a warning message to the user. If, in step 121, it is determined that the current stylus is not already qualified, then in step 123 the computer prompts the user to confirm that he is qualifying a new stylus (e.g. by pressing the button 70). If, in step 125, it is determined that the user is indeed wanting to qualify the stylus, the computer stores and displays the details in step 124, as before; if not, the computer simply returns to FIG. 9.

Step 114 is another optional step in FIG. 9. Here, the computer checks whether the currently selected stylus has been qualified. If the answer is Y, it continues around the loop, If not, it loops back to step 111, prompting the user to tell him that the stylus must be qualified. The user is thus prevented from carrying on until the stylus has been qualified. However, this step may not be necessary if one can be certain that the stylus will already have been qualified, e.g. if the initial stylus is automatically qualified at step 110, and if the FIG. 12 routine qualifies any subsequently selected stylus immediately.

The next optional item of the FIG. 9 routine allows the computer to decide whether the user is wishing to datum a part 61 newly positioned on the table 60. In step 115, it checks whether the current part has already been datumed, and if it has it passes on round the loop, taking no action. Otherwise as shown at step 116, it passes to the routine shown in FIG. 11.

Figure 11:
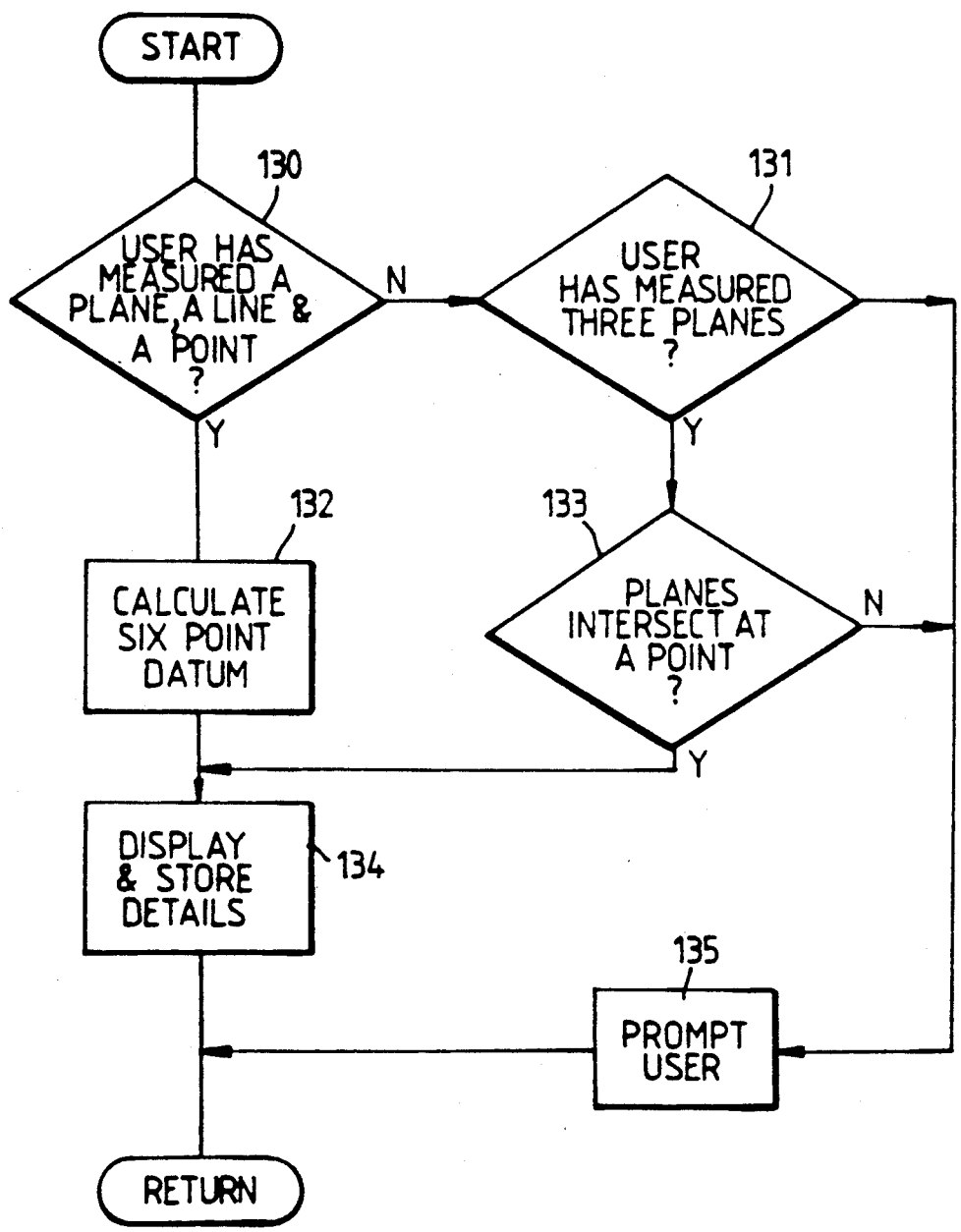

At step 130 in FIG. 11, the computer checks the previous three features inspected by the user. If they were a plane, a line and a point, with the vectors of the six points involved being approximately mutually perpendicular and the line being perpendicular to the plane, then in step 132 the computer calculates a six point datum. This involves making an assumption that the part 61 has three accurately orthogonal planar datum surfaces, and calculating (from the co-ordinates of the six points touched) the co-ordinates of the datum point at which those datum surfaces intersect, and the directions of three orthogonal datum axes along the lines of intersection of respective pairs of the surfaces. At step 134, the computer checks that the co-ordinates of the point thus calculated lie at a position consistent with being a datum point of a part 61, and if so it displays the details of the datum point and datum axes, and stores them so that all future measurements on this part can be referenced to them. These details may alternatively be sent to the control 66 if it is the control which has the responsibility for compensating the future measurements to reference them to the part datum. The program then returns to FIG. 9.

If, at step 130, it is determined that the user has not measured a plane, a line and a point, then at step 131 the computer checks whether he has measured three planes, and if so, whether they intersect at a point (step 133). The user might have measured three planes to give the datum because he cannot make the assumption that the part has three mutually perpendicular datum surfaces. If the answer to both steps 131 and 133 is yes, then the program proceeds to step 134, as above, to display and store the details of the datum point and datum axes. If the answer to either of these steps is no, then the program prompts the user (step 135) to warn him that the part needs to be datumed. The program then returns to FIG. 9.

One final optional feature of the program will now be described. As described so far, the program has simply made decisions (on the basis of the user's probe movements and touches) to identify the shape of a feature of the part 61, and then has proceeded to calculate an appropriate geometrical parameter of that feature. Instead of (or as well as) calculating the geometrical parameter, the computer 71 can automatically write lines of a part program, in the language appropriate to the control 66. When this part program is subsequently run by the control, it will automatically inspect a feature with the identified position and shape, and make the appropriate calculation in respect of the geometrical parameter. In use, the user will manually inspect all the desired features of a first part 61 of a production run of nominally identical such parts. The computer will automatically decide on the shape of each feature as it is inspected, and on the geometric parameter calculation to be performed, and will write appropriate lines of a part program. Once all the measurements are made, the complete part program can be downloaded from the computer 71 to the control 66. All subsequent parts 61 of the production run can then be automatically inspected by the action of the part program in the control 66, and the relevant calculations of their geometrical parameters made for each. This can be done without intervention from the user or from the computer 71 (which could be disconnected). The part program is also available for use with subsequent production runs of similar parts 61.

In more detail, program lines in a given control language can be written as follows.

As the user moves the probe at step 81 in FIG. 3, prior to touching a point on the part 61, a corresponding program line is generated in step 82 by the computer 71 and stored temporarily in its memory, in the form

MOVE TO X,Y,Z where X,Y,Z are the co-ordinates of the new position to which the user has moved the probe. This process is repeated for each move made by the user, generating a list of such program lines.

When the user signals a probing move, the routine of FIG. 4 comes into effect. At the end of that routine, in step 97, the computer adds further program lines to the list, of the form

TOUCH AT X,Y,Z

SAVE STANDARD RESULT AS P[1]

where X,Y,Z are the co-ordinates of the point touched on the surface of the part 61, and P[1] (or P[2], P[3], etc.) is a variable in which the measured co-ordinates of the point will be stored temporarily when the program is run.

When the decision routine of FIGS. 5 to 8 is run, and a decision has been reached as to the shape of the feature just inspected, then the various steps which calculate the corresponding geometrical parameter or parameters may optionally be omitted (since the user may not wish to have them if his chief concern is in generating a part program). Whether or not the calculation is actually performed at this time, however, the computer remembers the nature of the appropriate calculation. It uses this information in step 117 of FIG. 9, where it writes appropriate lines of the part program. For example, if the decision routine of FIGS. 5 to 9 identified a boss or a bore, lines of the following form may be written:

CALCULATE CIRCLE USING
P[1],P[2],P[3],P[4]

SAVE STANDARD RESULT AS C[1]

where C[1] (or C[2], C[3], etc.) is a variable in which the position and diameter of the boss or bore are stored. If a slot or flange has been identified then lines of the following form may be written:

CALCULATE DISTANCE USING P[1], P[2]

or if the slot or flange is identified as shown at 35 or 36 (FIG. 7b), and the straight line has already been stored in a variable L[1]:

CALCULATE DISTANCE USING L[1], P[1]

In either case, the resulting thickness of the flange or width of the slot can be saved by writing a line of the form:

SAVE STANDARD RESULT AS L[2]

Once the feature has been decided upon, a further program line is preferably written, to throw away the contents of the variables P[1],P[2],P[3] etc. used to store the co-ordinates of the points measured while measuring that feature. This enables the memory in which these variables are stored to be re-used.

If the routines of FIGS. 10, 11 or 12 (stylus qualification, part datuming or stylus selection) have been performed during the FIG. 9 loop, then step 117 adds appropriate program lines for these activities to the part program it is generating. A line for automatic stylus qualification may be written at the start of the part program, corresponding to step 110.

A part program can therefore be generated entirely automatically, the user merely having to move the probe with the joystick 69 in exactly the same manner as he would when inspecting a single part 61. No skill in writing custom part programs is required of the user, and so the machine can be operated by a relatively low skilled operator.

Various modifications are possible to the system described, as follows.

Although touch trigger probes have been used in the above examples, because they are generally the most convenient for this kind of inspection, the invention also encompasses the use of other kinds of probe for sensing the part 61. For example, routines corresponding to those described above can easily be written for use with non-contact or analogue output probes.

Although the article 61 to be inspected has been mounted on a fixed table 60 and the probe 62 on the movable part of the CMM in the above examples, the probe can equally well be fixed and the article to be inspected can be on a movable table, as is well known in such machines.

It has already been pointed out that the joystick 69 can be omitted if the machine quill can be manually manipulated, and of course other methods of manipulating the quill can be used, such as handwheels for X, Y and Z motion.

The examples above have all been for use on a CMM, but it is well known to use probes on a machine tool for inspecting a part during or after manufacture on that machine tool. Similar routines to those described above could be used for such inspection on machine tools. Indeed, the routines described could be used to inspect features of a model or prototype, deciding upon their shape, size, location, etc. and a part program could then be automatically written for the machine tool, in a similar manner to that just described, to cut a billet of metal so as to reproduce the features of the model or prototype.

Although the examples of stylus qualification above have made use of a spherical datum surface 72 for stylus qualification, other datum surfaces may be used, as is well known. For example, planar X,Y,Z datum surfaces may be provided. The program may then be arranged to decide (in steps corresponding to steps 112 and 120 in FIGS. 9 and 10) that the points touched and/or their associated vectors indicate that the user has touched one or more of these datum surfaces, and to proceed with stylus qualification.

We claim:
1. A method of inspecting an article using coordinate positioning apparatus comprising a fixed part, a movable part, coordinate measuring means for providing outputs indicative of the relative positions of the fixed and movable parts, and probe means mounted on one of said fixed and movable parts for sensing points on a said article mounted on the other of said fixed and movable parts, the method comprising:

moving the probe means relative to the article, towards points on the article;

determining the direction of movement of the probe means relative to each of said points;

determining coordinates of each of said points in response to the probe means and outputs of the coordinate measuring means; and on the basis of said directions, making a decision concerning the geometrical shape of at least a portion of said article.

2. A method according to claim 1, including the further step of computing a geometrical parameter of the article on the basis of the shape decided upon and said co-ordinates.

3. A method according to claim 1, wherein, if said directions are substantially co-linear, and convergent, then said decision is that the shape is a flange.

4. A method according to claim 1, wherein, if said directions are substantially co-linear, and divergent, then said decision is that the shape is a slot.

5. A method according to claim 1, wherein, if there are at least three said points, and if said directions are substantially non-parallel, co-planar, and convergent to a point, then said decision is that the shape is a boss.

6. A method according to claim 1, wherein, if there are at least three said points, and if said directions are substantially non-parallel, co-planar, and divergent from a point, then said decision is that the shape is a bore.

7. A method according to claim 1, wherein, if said decision indicates that the sensed points lie on a datum surface provided on said other of said fixed and movable parts, the method further includes the steps of calculating and storing a stylus qualification offset for correcting measurements made on a said article.

8. A method according to claim 1, wherein, if said decision indicates that the sensed points lie on a datum feature of said article, then details of said datum are stored for use when making other measurements on said article.

9. A method according to claim 1, wherein, if said directions are substantially coplanar and convergent, then said decision is that the shape is a flange.

10. A method according to claim 1, wherein, if said directions are substantially coplanar and divergent, then said decision is that the shape is a slot.

11. A method according to claim 1, including the further step of generating a part program for inspecting a said article, on the basis of the shape decided upon and said co-ordinates.

12. A method according to claim 11, wherein, if said decision indicates that the sensed points lie on a datum surface on said other of said fixed and movable parts, the method further includes generating a command in said part program for performing a step of calculating and storing a stylus qualification offset, so that said calculating and storing step is carried out when the part program is run.

13. A method according to claim 11, wherein, if said decision indicates that the sensed points lie on a datum feature of said article, then a command is generated in said part program for datuming a said article when the program is run.

14. A method of inspecting an article using coordinate positioning apparatus comprising a fixed part, a movable part, coordinate measuring means for providing outputs indicative of the relative positions of the fixed and movable parts, and probe means mounted on one of said fixed and movable parts for sensing points on a said article mounted on the other of said fixed and movable parts, the method comprising:

moving the probe means relative to the article, towards points on the article;

determining coordinates of each of said points in response to the probe means and outputs of the coordinate measuring means;

determining the geometrical shape of at least a portion of said article from the determined coordinates.

15. A method according to claim 14, wherein said step of determining the geometrical shape includes using the determined coordinates to determine the direction of movement of the probe means relative to each of said points, and determining said geometrical shape on the basis of said directions.

16. A method according to claim 14, including the further step of computing a geometrical parameter of the article on the basis of the shape decided upon and said coordinates.

17. A method according to claim 14, wherein, if said decision indicates that the sensed points lie on a datum surface provided on said other of said fixed and movable parts, the method further includes the steps of calculating and storing a stylus qualification offset for correcting measurements made on a said article.

18. A method according to claim 14, including the further step of generating a part program for inspecting a said article, on the basis of the shape decided upon and said coordinates.

19. A method according to claim 18, wherein, if said decision indicates that the sensed points lie on a datum surface on said other of said fixed and movable parts, the method further includes generating a command in said part program for performing a step of calculating and storing a stylus qualification offset, so that said calculating and storing step is carried out when the part program is run.

20. A method of inspecting an article using coordinate positioning apparatus comprising a fixed part, a movable part, coordinate measuring means for providing outputs indicative of the relative positions of the fixed and movable parts, and probe means mounted on one of said fixed and movable parts for sensing points on a said article mounted on the other of said fixed and movable parts, the method comprising:

providing data representing movements of the probe means relative to the article;

on the basis of said data representing probe movements, making a decision concerning the geometrical shape of at least a portion of said article;

generating a part program for controlling the operation of said apparatus in order to inspect said article with the probe means, the program generated including at least one command for performing a step which is determined in accordance with said shape decided upon; and running the part program to cause said apparatus to inspect said article.

21. A method according to claim 20, wherein said at least one command included in the part program is a command for computing a geometrical parameter of the article on the basis of the shape decided upon.

* * * * *